ial Patent [19] [11] 3,857,826
Greene et al. [45] Dec. 31, 1974

[54] FLUID, HYDROXYL-TERMINATED ETHYLENE/PROPYLENE COPOLYMERS

[75] Inventors: Robin Nikolas Greene, Wilmington; Edward Sohl, New Castle, both of Del.

[73] Assignee: E. I. du Pont de Nemours and Company, Wilmington, Del.

[22] Filed: Aug. 24, 1973

[21] Appl. No.: 391,455

[52] U.S. Cl. ............ 260/88.2 R, 149/19, 260/75 A, 260/77.5 CR, 260/80.7
[51] Int. Cl. ............................................. C08f 15/04
[58] Field of Search ...................... 260/80.7, 88.2 R

[56] References Cited
UNITED STATES PATENTS 3,392,154 7/1968 Baldwin..................... 260/77.5 C R
3,586,552 6/1971 Potts et al............................. 149/20
3,682,870 8/1972 Dall'Asta et al................... 260/80.7

*Primary Examiner*—M. J. Welsh

[57] ABSTRACT

Fluid hydroxyl-terminated ethylene/propylene copolymers, suitable as binders for solid propellants, are prepared by ozonolysis at a temperature less than 0°C., preferably no higher than about −8°C., of a random ethylene/propylene/butadiene terpolymer in a solvent containing up to 5 weight percent of ethanol or a higher alcohol and reduction of the crude reaction product with sodium borohydride in ethanol or a higher alcohol.

7 Claims, No Drawings

FLUID, HYDROXYL-TERMINATED ETHYLENE/PROPYLENE COPOLYMERS

BACKGROUND OF THE INVENTION

This invention relates to a process for preparing fluid hydroxyl-terminated ethylene/propylene copolymers and to the copolymers produced thereby.

Curable solid fuel propellant compositions require a binder, which usually is an elastomeric material. This can be, for example, polyisobutylene, as disclosed in U.S. Pat. No. 3,634,383; or a saturated copolymer of ethylene with an α-olefin, the copolymer having terminal groups such as hydroxyl, carboxyl, or amino, as described in U.S. Pat. No. 3,586,552. This latter patent discloses the preparation of such functional group-containing copolymers by a free radical initiated polymerization, wherein the free radical source contains either the required end group or a group which can be readily converted to the required end group. Hydroxyl groups thus are introduced by reduction of ethoxycarbonyl groups, which are present when the free radical generator is diethyl 2,2'-azobisisobutyrate.

A fluid polymer which has functional groups suitable as crosslinking sites is a potentially good binder for solid propellants because it can be quite easily mixed with the fuel and the oxidant and cured at relatively low and safe temperatures.

Although ozonolysis of organic compounds having ethylenic unsaturation is well known in the art, no work apparently has been done on the preparation of fluid, hydroxyl-terminated polymers by that route.

Definition

For the purpose of the present disclosure, the term "fluid", as applied to a hydroxyl-terminated ethylene/propylene copolymer, means that the copolymer (which is capable of chain extension or crosslinking) has a Brookfield viscosity of less than 1500 poises at temperatures up to 100°C.

SUMMARY OF THE INVENTION

According to this invention, there is now provided a process for making fluid, hydroxyl-terminated ethylene/propylene (HTEP) copolymers, which can be cured to rubbery materials. These copolymers are suitable, for example, as binders for solid propellants. The process of this invention starts with a solution of a random ethylene/propylene/butadiene terpolymer in a mixture of a solvent which remains liquid at the operating temperature and resists both ozone and sodium borohydride with about 1–5 weight percent of ethyl or higher alkyl alcohol, having up to about 20 carbon atoms. The following steps are carried out sequentially:

a. contacting the solution with ozone at a temperature below 0°C until all the double bonds in the polymer have reacted;

b. removing any excess ozone from the reaction vessel;

c. contacting the reaction mixture with a solution of about 1.0–1.5 moles per mole of double bonds in the starting terpolymer of sodium borohydride in ethanol or an alcohol having up to about 20 carbon atoms;

d. decomposing excess sodium borohydride and any polymeric borate esters with a mineral acid;

e. extracting any mineral acid and salts with water; and f. recovering the polymeric product from the solvent solution.

The starting ethylene/propylene/butadiene terpolymer is best made by the process of British Pat. No. 1,277,630 (to Montecatini Edison, S.p.A.), except that polymerization is run preferably at 20°–60°C, rather than at −30° to 20°C. as taught by the Montecatini patent.

The HTEP products made by the process of this invention have a number average molecular weight of about 4,000 – 10,000 and a hydroxyl functionality of about 1.8 – 3.0.

DETAILED DESCRIPTION OF THE INVENTION

It is essential for the success of this process that the ozonolysis step be carried out at a temperature below 0°C, preferably no higher than about −8°C. At higher temperatures, undesirable carbonyl-containing by-products are formed. It is believed that the reaction follows the course illustrated in the following scheme, where only the carbon atoms connected by the double bond are shown:

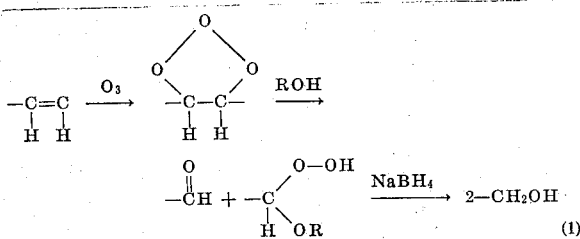

(1)

At temperatures of 0°C or above, the following reaction is believed to occur:

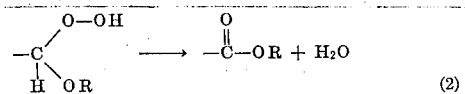

(2)

The resulting ester is not reducible by sodium borohydride. In both the above schemes, R is ethyl or a higher alkyl.

In the absence of alcohol, the cyclic ozonide would rearrange as shown below:

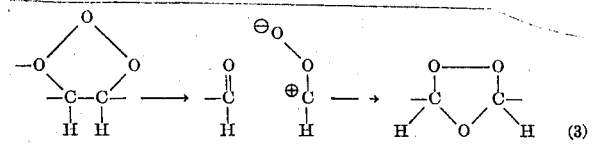

(3)

the final rearrangement product precipitating from the solution. It thus can be seen that the presence of a small amount of an alcohol in the ozonolysis reaction medium is necessary. In its presence and at temperatures below 0°C, formation of other functional groups than hydroxyl groups is avoided. Any temperature below 0°C is suitable, provided the starting terpolymer is soluble at that temperature in the reaction solvent. A practical lower limit is about −16°C. The preferred upper limit is about −8°C. As the operating temperature approaches 0°C, minor amounts of carbonyl groups sometimes may be detected.

According to the process of British Pat. No. 1,277,630, the copolymerization of ethylene, propylene, and 1,3-butadiene to unsaturated, amorphous or substantially amorphous, high molecular weight, linear copolymers is carried out in the presence of a catalyst system prepared in the presence of an aromatic hydrocarbon and comprising:

a. a vanadium compound soluble in hydrocarbons;
b. the product of the reaction between a dialkylaluminum monohalide and water, or a tin oxide of the general formula $R_3SnOSnR_3$, wherein each R is an alkyl group, in a molar ratio of 2:1, and
c. an aluminum alkyl chloride or bromide in which each alkyl group is linear or branched and contains up to 16 carbon atoms. The copolymerization is carried out in solution, the molar proportions of propylene to butadiene in solution being 5:1 to 200:1, and the molar proportions of propylene to ethylene being 4:1 to 40:1. The resulting polymers are random terpolymers of ethylene, propylene, and butadiene, butadiene portions being randomly distributed in monomeric units. It has been found that the terpolymer made by the process of British Pat. No. 1,277,630, but at a temperature of 20°–60°C, rather than at −30° to 20°C required by that patent, has the random monomer distribution required by the process of this invention.

The terpolymer is dissolved in a solvent such as carbon tetrachloride or chloroform to give a 0.5–2 weight percent solution, preferably about 1 weight percent. As stated earlier, about 1–5 weight percent of ethanol or a higher alcohol also is present. The solution is filtered to remove gel, if any, prior to the ozonolysis reaction. The rate of ozone addition should preferably be as high as the rate of ozone disappearance from the reaction mixture, thus leading to a quantitative reaction. The rate of disappearance of ozone may be tested, for example, by contacting the exhaust gas with a potassium iodide - starch solution or paper. Any commerical ozonator is suitable in the process of this invention.

Removal of unchanged ozone from the reaction medium is best effected by purging with nitrogen.

In the step (c) of the process, a concentrated or saturated sodium borohydride solution in an alcohol is added slowly at a temperature below 0°C; then, the reaction mixture is allowed to warm up to room temperature. A saturated solution of sodium borohydride in ethanol contains about 4 g/100 ml. A suitable concentration range is about 3–4 g $NaBH_4$ per 100 ml. The reaction mixture is heated at reflux to complete the reduction reaction and is then allowed to cool to room temperature.

Excess sodium borohydride is removed most conveniently by decomposition with dilute (about 10 weight percent) aqueous hydrochloric acid, which is added slowly to the reaction mixture. Any borate esters of the HTEP product are decomposed in the same operation.

After excess mineral acid and any mineral salts present in the mixture are extracted with water, the organic solvent phase is preferably concentrated in vacuum at about 60°–80°C to about 10–20 percent of its original volume, and it is poured into 3–5 volumes of a polar organic liquid which is a nonsolvent for the HTEP product. Typical such polar liquids include methanol, ethanol, acetone, methyl ethyl ketone, etc. The HTEP product, which precipitates, is washed with an additional amount of the nonsolvent liquid to remove low molecular weight, nonfunctional byproducts, which usually also are present. While other recovery methods are also possible, the above method is the most practical on a laboratory scale. Washing with a liquid which removes low molecular weight side-products is important.

The reaction product, although made from an ethylene/propylene/butadiene terpolymer, is referred to in the present specification as a hydroxyl terminated ethylene/propylene copolymer (HTEP). This expression is believed to be accurate because copolymerization of ethylene with propylene and butadiene produces a terpolymer in which butadiene has undergone a 1,4-addition and is present in the chain as the —C—C=C—C— group. This group then is ozonolyzed to two —$CH_2$—$CH_2$—OH groups. The resulting product will thus have ethylene, propylene, and hydroxyethyl groups. Ideally, each polymer should have two terminal hydroxyethyl groups; however, because of possible branching of the starting terpolymer, the hydroxyl functionality may be as high as an average of three hydroxyl groups per molecule.

As mentioned above, the hydroxyl functionality decreases as the temperature of ethylene, propylene, and butadiene copolymerization increases. Low temperature polymerization, for example, according to the disclosure of British Pat. No. 1,277,630, leads to terpolymers which are ozonolyzed to products having an average hydroxyl functionality higher than 3. These products are not within the scope of this invention since they cannot be used in the manner disclosed herein.

The HTEP products of this invention can be used as starting materials for the preparation of poly urethanes, polyurethane-polyureas, and polyesters by standard, well known procedures. Such products have good ozone resistance, good low temperature resistance, and high heats of combustion. These properties are very desirable in rocket fuel binders. Mixtures of the HTEP products of this invention with other polyols can be successfully used in the preparation of the above polymers.

This invention is now illustrated by the following examples of certain representative embodiments thereof, wherein all parts, proportions, and percentages are by weight unless indicated otherwise.

EXAMPLE 1

Preparation of the Starting Ethylene/Propylene/Butadiene Terpolymer

A polymer of ethylene, propylene and butadiene was prepared by continuously introducing 2.0 g/min ethylene, 20.7 g/min propylene, 3.1 g/min butadiene, 81.09 ml/min toluene, 3.0 ml/min of a 7.7 mM solution of vanadium tris-(acetyl acetonate) in toluene, and 23.8 ml/min of the reaction product of water and diethylaluminum chloride in toluene (made up by contacting 19.6 mmole of water with 98.2 mmole aluminum compound per liter of final solution) into a stirred 2.34 liter pressure vessel maintained at 30°C. Effluent was removed so as to maintain a pressure of 7.0–7.8 kg/cm². After the initial 1.5 hr., polymer solution was collected for 4 hours and continuously stabilized by the addition of 2 ml/min of a solution of 8 g 4,4'-thiobis(3-methyl-6-tert-butylphenol) in 470 ml isopropyl alcohol and 3300 ml. hexane. The polymer was isolated by washing the solution once with 10% hydrochloric acid, 3 times with water, and removing the solvent. Analysis showed the polymer to contain 26.3% by weight propylene and 9.7% unsaturation, expressed as butadiene. The polymer had an inherent viscosity of 1.26 (measured at 30°, 0.1 gram polymer/100 ml tetrachloroethylene) and the total yield was 299.9 grams.

EXAMPLE 2

Ozonolysis of the Terpolymer of Example 1

The terpolymer of Example 1 was dissolved in a mixture of 6600 ml carbon tetrachloride and 200 ml ethanol and filtered through a coarse paint filter into a 22-1 flask, equipped with an inlet via a frit dipping below the liquid surface, a gas outlet to a gas washing bottle containing 5% aqueous potassium iodide, a thermometer and a mechanical stirrer. The contents of the flask were cooled to $-10°C$ by immersing in a dry-ice slurry, and ozone from a laboratory ozonator set at 0.56 kg/cm$^2$ air and 120 volts at an average flow of 213 cm$^3$/min was passed through while maintaining the temperature at $-10°C$ for 18 hrs and 40 min; at which time the potassium iodide solution darkened rapidly. Nitrogen was bubbled through the reaction mixture for 5 min to remove ozone; then a solution of 15.2 g sodium borohydride in 500 ml ethanol was added over 15 min, maintaining the temperature at 10° C. The mixture was allowed to warm gradually to room temperature, then heated to reflux for 1 hr, and cooled back to room temperature. Excess hydride was destroyed by adding 1 liter of dilute hydrochloric acid. The organic layer was washed twice with 10% hydrochloric acid, twice with water, and concentrated to 1 liter by removal of solvent under vacuum. The resulting thick liquid was precipitated by pouring into 2800 ml methanol, and the precipitated polymer was removed and triturated with an additional 2800 ml of methanol. The polymer was dried first in a vacuum oven at 80°C, then in a vacuum desiccator and finally on a three-roll ink mill heated above 100°C with steam. The resulting HTEP polymer (154.5 g) had the following properties:

remaining unsaturation: < 0.5% by infrared (as butadiene)

hydroxyl number: 20, thus OHequivalent 2840 number average molecular weight: 7950 (vapor phase osmometry at 35° in chloroform solution); hydroxyl functionality = molecular weight/OH equivalent = 7,950/2,840 = 2.8.

absence of carbonyl content confirmed by infrared type of hydroxyl group: primary as measured by nuclear magnetic resonance of hexafluoroacetone adduct by a procedure similar to G. R. Leader, Anal. Chem., 42, 16 (1970)

Brookfield viscosity: 26,000 cps (93°C)
108,000 cps (61.2°C)
490,000 cps (35.5°C)

measured with a No. 7 spindle)

glass transition temperature: $-56°C$ by differential scanning calorimetry

EXAMPLE 3

Polyurethane Preparation

A 5.0 gm sample of the HTEP polymer of Example 2 was heated in a vacuum oven to degas it and to lower its viscosity. It was mixed with 0.126 ml mixed 2,4- and 2,6-toluenediisocyanate and cast into a mold. The mold was returned to the oven to allow bubbles to break, then heated to 150°C in a press and allowed to cool slowly overnight in the press. The slab was cut into two 6.34 cm strips, and hardness was measured by ASTM Method D-676 and stress-strain properties by ASTM Method D-412. The results were:

| | |
|---|---|
| Hardness | 48 Shore A |
| Modulus at 100% elongation, $M_{100}$ | 8.4, 8.4 kg/cm$^2$ |
| Tensile strength at break, $T_B$ | 41, 20 kg/cm$^2$ |
| Elongation at break, $E_B$ | 46, 31% |

EXAMPLE 4

Polyurethane-Polyurea Preparation

A 5.01 gm sample of the HTEP polymer of Example 2 was mixed with 0.614 ml mixed 2,4- and 2,6-toluenediisocyanate at 100°C and placed in a vacuum oven for 1 hr at 100°C. Then 0.913 g molten methylenebis(orthochloroaniline) was stirred in, the mixture was placed in a mold and cured for 1 hr at 100°C in a press. The physical properties of the resulting slab were measured in duplicate as in Example 3:

| | |
|---|---|
| Hardness | 77 Shore A |
| $M_{100}$ | 38, 38 kg/cm$^2$ |
| $T_B$ | 69, 53 kg/cm$^2$ |
| $E_B$ | 220, 190% |
| Permanent Set | 2, 4% |

Other polyisocyanates and other polyamines can be used to produce elastomeric polyurethane-polyureas within the scope of this invention. Usually, in the first stage of the preparation HTEP polymer is contacted with excess polyisocyanate, and the resulting isocyanateterminated polymer is cured with stoichiometric amount of a primary polyamine. Both aromatic and aliphatic polyamines and especially diamines are useful in this process, for example, methylenebis(aniline) and 1,4-diaminobutane.

EXAMPLE 5

Polyurethane Preparation

A 5.00 gm sample of the HTEP of Example 2 was mixed with 251.2 ul of 2,4-toluenediisocyanate and heated to 100°C under nitrogen for 16 hours. Trimethylolpropane (0.0788 gm) was added with stirring, and the mixture was degassed for 2 hr in a vacuum oven. The mixture was cast in a 1.91 × 7.62 cm mold, placed in a vacuum oven at 100°C for 1 hr, and then under nitrogen at atmospheric pressure and 100°C for 2.5 days. A rubbery product resulted.

EXAMPLE 6

Polyurethane Preparation

A polyurethane was prepared from a sample of the HTEP polymer of Example 2, 1,4-butanediol, and 2,4-toluenediisocyanate, (dioctyl tin dilaurate catalyst) using the general procedure of Example 3. When the polyurethane was exposed to a 100 ppm ozone atmosphere for 200 hr, it showed no sign of cracking under 10X microscopic examination.

EXAMPLE 7
Polyurethane Preparation

A polyurethane was prepared from a 4.99 g sample of HTEP polymer of Example 2 and 0.223 ml of a polymethylene polyphenyl isocyanate, sold as "PAPI" by the Upjohn Co. and containing 31% NCO. The HTEP was degassed under vacuum at 100°C for 2 hours, mixed with the polyisocyanate, and heated for 2 hours at 100°C in a vacuum oven. The product was a rubbery solid.

EXAMPLE 8
Ozonolysis of the Terpolymer of Example 1 and Omission of the Washing Step A. The procedure of Example 2 was followed except that ozonolysis was carried out at a temperature of 0°-10°C, and that a mixture of chloroform and methanol was used as the ozonolysis solvent. In addition, the reaction product was not washed to remove low molecular weight by-products. The product was an HTEP polymer with a number average molecular weight of 1460 and a hydroxyl equivalent of 1169, containing carboxylic acid groups and having an acid equivalent weight of 2941.

B. The ozonolysis procedure of Example 2 was repeated, except that the temperature was maintained at −9° to −8°C, that isopropyl alcohol was used as the solvent for the sodium borohydride in the reduction step, and that the product was not washed to remove low-molecular-weight by-products. The product had a number average molecular weight of 1610, measured in tetrahydrofuran at 35°C by vapor osmometry and a hydroxyl equivalent of 1136, but contained no carbonyl group by infrared examination.

It can be seen that, if low-molecular-weight material is not removed by washing, low hydroxyl functionality results. Furthermore, groups other than hydroxyl are formed readily above 0°C.

HTEP polymers of this invention can be used for the preparation of polyesters by reaction with anhydrides or halides of dicarboxylic or polycarboxylic acids, such as phthalic, adipic, and succinic. Such reactions often are catalyzed by either acidic or basic catalysts. Another suitable technique involves transesterification of a lower ester of suitable dicarboxylic or polycarboxylic acid at elevated temperature in the absence or presence of catalysts.

We claim:

1. A fluid, substantially carbonyl-free, hydroxyl-terminated ethylene/propylene random copolymer having a number average molecular weight of about 4,000-10,000 and a hydroxyl functionality of about 1.8-3.0.

2. A process for the preparation of a fluid, substantially carbonyl-free, hydroxyl-terminated ethylene/propylene random copolymer having a number average molecular weight of about 4,000-10,000 and a hydroxyl functionality of about 1.8-3.0, said process comprising the following sequential steps:
   a. contacting with ozone at less than 0°C a solution of a random ethylene/propylene/butadiene terpolymer in a mixture of a solvent which remains liquid at operating temperature and resists both ozone and sodium borohydride with about 1-5 wt percent of ethanol or an alkyl alcohol having up to 20 carbon atoms, until all the double bonds in the polymer have reacted;
   b. removing any excess ozone from the reaction vessel;
   c. contacting the reaction mixture with a solution of about 1.0-1.5 moles per mole of double bonds in the starting terpolymer of sodium borohydride in ethanol or an alcohol having up to 20 carbon atoms;
   d. adding a mineral acid to the reaction mixture of step (c) to decompose excess sodium borohydride and any polymeric borate ester; and
   e. extracting any mineral acid and salts with water; and
   f. recovering the polymeric product from the solvent solution.

3. The process of claim 2, wherein the temperature of step (a) is maintained at a temperature no higher than about −8°C.

4. The process of claim 3 wherein the lower temperature limit is −16°C.

5. The process of claim 2 wherein the starting ethylene/propylene/butadiene terpolymer is a random, unsaturated, substantially amorphous, high molecular weight, linear polymer, in which the butadiene portions are randomly distributed as monomeric units.

6. The process of claim 2 wherein the rate of ozone addition is as high as the rate of ozone disappearance from the reaction mixture.

7. The process of claim 2 wherein the reaction product is recovered by concentrating the organic solvent phase of step (e) in vacuum at about 60°-80°C to about 10-20% of its original volume; pouring into a polar organic liquid which is a nonsolvent for the product; isolating the precipitated product; and washing the product with a liquid which removes low molecular weight side-products.

* * * * *